United States Patent
De'Longhi (10) Patent No.: US 9,226,612 B2
(45) Date of Patent: Jan. 5, 2016

(54) COFFEE MACHINE EXHIBITING A SELECTIVE LOADING DEVICE OF A COFFEE CAPSULE INTO AN INFUSOR

(75) Inventor: Giuseppe De'Longhi, Treviso (IT)

(73) Assignee: De'Longhi Appliances S.r.l., Treviso (IT)

( * ) Notice: Subject to any disclaimer, the term of this patent is extended or adjusted under 35 U.S.C. 154(b) by 273 days.

(21) Appl. No.: 13/982,604

(22) PCT Filed: Jan. 12, 2012

(86) PCT No.: PCT/EP2012/050442
§ 371 (c)(1),
(2), (4) Date: Jul. 30, 2013

(87) PCT Pub. No.: WO2012/104125
PCT Pub. Date: Aug. 9, 2012

(65) Prior Publication Data
US 2013/0312618 A1    Nov. 28, 2013

(30) Foreign Application Priority Data
Feb. 2, 2011    (IT) .................................. MI11A0139

(51) Int. Cl.
*A47J 31/06* (2006.01)
*A23F 5/00* (2006.01)
*A47J 31/40* (2006.01)
*A47J 31/36* (2006.01)

(52) U.S. Cl.
CPC ............ *A47J 31/407* (2013.01); *A47J 31/3633* (2013.01); *A47J 31/3642* (2013.01)

(58) Field of Classification Search
None
See application file for complete search history.

(56) References Cited

U.S. PATENT DOCUMENTS

| | | | | |
|---|---|---|---|---|
| 1,890,062 | A * | 12/1932 | Madden | 221/222 |
| 3,086,638 | A * | 4/1963 | Keesling | 198/386 |
| 4,724,752 | A | 2/1988 | Aliesch et al. | |
| 7,885,520 | B2 * | 2/2011 | Stettes | 392/318 |
| 9,058,712 | B2 * | 6/2015 | Magno | |
| 2007/0181613 | A1* | 8/2007 | Ben-Shlomo et al. | 222/413 |
| 2008/0038423 | A1 | 2/2008 | Klant et al. | |

FOREIGN PATENT DOCUMENTS

| | | |
|---|---|---|
| EP | 1541070 | 6/2005 |
| EP | 1935298 | 6/2008 |

OTHER PUBLICATIONS

International Search Report; International Application No. PCT/EP2012/050442; International Filing Date: Jan. 12, 2012; 4 pages.
(Continued)

*Primary Examiner* — Thor Campbell
(74) *Attorney, Agent, or Firm* — Blank Rome LLP (57) ABSTRACT

In the coffee machine (1) exhibiting a selective loading device of a coffee capsule into an infusor, the loading device comprises at least an advancement line (L) exhibiting at least a motorized conveyor screw (11) for step movement of at least a stack (6) of capsules (7, 9) along a support and guide channel (14) of the advancement of the stack (6) of capsules (7, 9) towards a release section (8), and manual command means for enabling the advancing by a step of said at least a stack of capsules (7, 9), the channel (14) exhibiting, at an upper side thereof, windows (16) having a complementary shape to the capsules (7, 9) for introduction thereof with a compulsory orientation suitable for correct use with the conveyor screw (11).

12 Claims, 7 Drawing Sheets

(56) References Cited

OTHER PUBLICATIONS

Written Opinion; International Application No. PCT/EP2012/050442; International Filing Date: Jan. 12, 2012; 5 pages.

English translation of abstract; European Application No. EP1935298; 1 page.

English translation of abstract; French Application No. FR2907766; 1 page.

* cited by examiner

COFFEE MACHINE EXHIBITING A SELECTIVE LOADING DEVICE OF A COFFEE CAPSULE INTO AN INFUSOR

The present invention relates to a coffee machine exhibiting a selective loading device of a coffee capsule into an infusor.

Today the market offers coffee machines exhibiting a rotating drum loader which supports vertical stacks of selectively alignable capsules at a collecting section of the lowest capsule of the stack, which is then moved towards the infusor.

The rotating drum is positioned in general above the upper base of the coffee machine and significantly contributes to increasing the vertical size of the coffee machine, thus creating potential limitations in use thereof, for example in a case of a presence of shelves or cupboards obstructing the correct positioning of the coffee machine.

The need not to obstruct the wide degree of movement of the parts of the rotating drum requires setting aside large free spaces, which contribute to increasing the overall size of the coffee machine.

The geometry of the rotating drum also has a negative effect as regards best use of the spaces, and contributes to increasing the overall size of the coffee machine.

So as not to project laterally from the coffee machine, the circular plan shape of the rotating drum must be contained within the quadrangular plan shape of the coffee machine. Maximum exploitation of the available surface on the upper base of the coffee machine is thus obtained when the circular shape of the rotating drum is contained within the quadrangular shape of the coffee machine. As in general a coffee machine has an elongate quadrangular plan shape in a direction, the constraint of having to contain the circular shape of the rotating drum within the quadrangular shape of the coffee machine leads to considerable waste of space left unused above the upper base of the coffee machine at the residual part of the quadrangular shape of the coffee machine.

The technical objective set by the present invention is, therefore, to realise a coffee machine exhibiting a selective loading device of a coffee capsule into an infusor which enables elimination of the technical drawbacks noted in the prior art.

In the ambit of the above technical objective, an aim of the invention is to realise a coffee machine exhibiting a selective loading device of a coffee capsule into an infusor which optimises the occupation of the spaces normally available on the coffee machine and limits the overall size in height thereof.

A further aim of the invention is to realise a coffee machine in which a selective loading device of a coffee capsule into an infusor is structurally simple, effective and reliable.

The technical aim, as well as these and other aims, according to the present invention, are attained by realising a coffee machine exhibiting a selective loading device of a coffee capsule into an infusor, characterised in that said loading device comprises at least an advancement line exhibiting at least a motorised conveyor screw for a determined step movement of at least a stack of capsules along a support and guide channel of the advancement of said stack of capsules towards a release section, and manual command means for enabling advancement by a step of said at least a stack of capsules, said channel exhibiting, at an upper side thereof, windows having a complementary shape to the capsules for introduction thereof with a compulsory orientation suitable for correct engagement thereof with the conveyor screw.

The advancement line preferably exhibits a straight development.

The advancement line preferably develops from the rear part to the front part of the upper base of coffee machine.

The advancement line preferably develops substantially horizontally.

Said channel and said conveyor screw preferably exhibit the longitudinal axe thereof straight and parallel to the straight development direction of said advancement line.

Said channel is preferably positioned in a housing present at the upper base of the coffee machine and exhibiting an openable cover for access to the channel.

At least in the case in which several advancement lines are present, a fixed descending conveyor is preferably positioned below said release section, common for all the advancement lines, along which the capsule released from a release section is slidable and/or rollable by gravitational fall towards a section that is vertically aligned to the underlying infusor at which the capsule is released.

Said conveyor screw preferably exhibits, at the base thereof, an activating cam of a microswitch for interrupting the rotation of the motor which activates said conveyor screw when the stack of capsules advances by a step.

The motor is preferably positioned at the rear portion of the upper base of the coffee machine.

The loading device is extremely compact and optimises the occupation of the spaces of the coffee machine, since the providing of the loading device, which exhibits a substantially horizontal development that can involve up to the whole extension of the upper base of the coffee machine, does not significantly contribute to increasing the overall dimension of the coffee machine in a vertical direction. This enables positioning the coffee machine with greater flexibility, even in more restricted spaces having a height limited for example due to the present of shelving or cupboards.

The loading device is safe and reliable in function, as it exploits a mechanism that is suitable for ensuring selective supply of a single capsule to the infusor.

Further characteristics and advantages of the invention will more fully emerge from the description that follows, of a preferred but not exclusive embodiment of the coffee machine with a selective loading device of a coffee capsule according to the invention, illustrated by way of non-limiting example in the accompanying drawings, in which.

With reference to the above-cited figures, a coffee machine is illustrated, denoted in its entirety by reference number 1.

Figure 1:
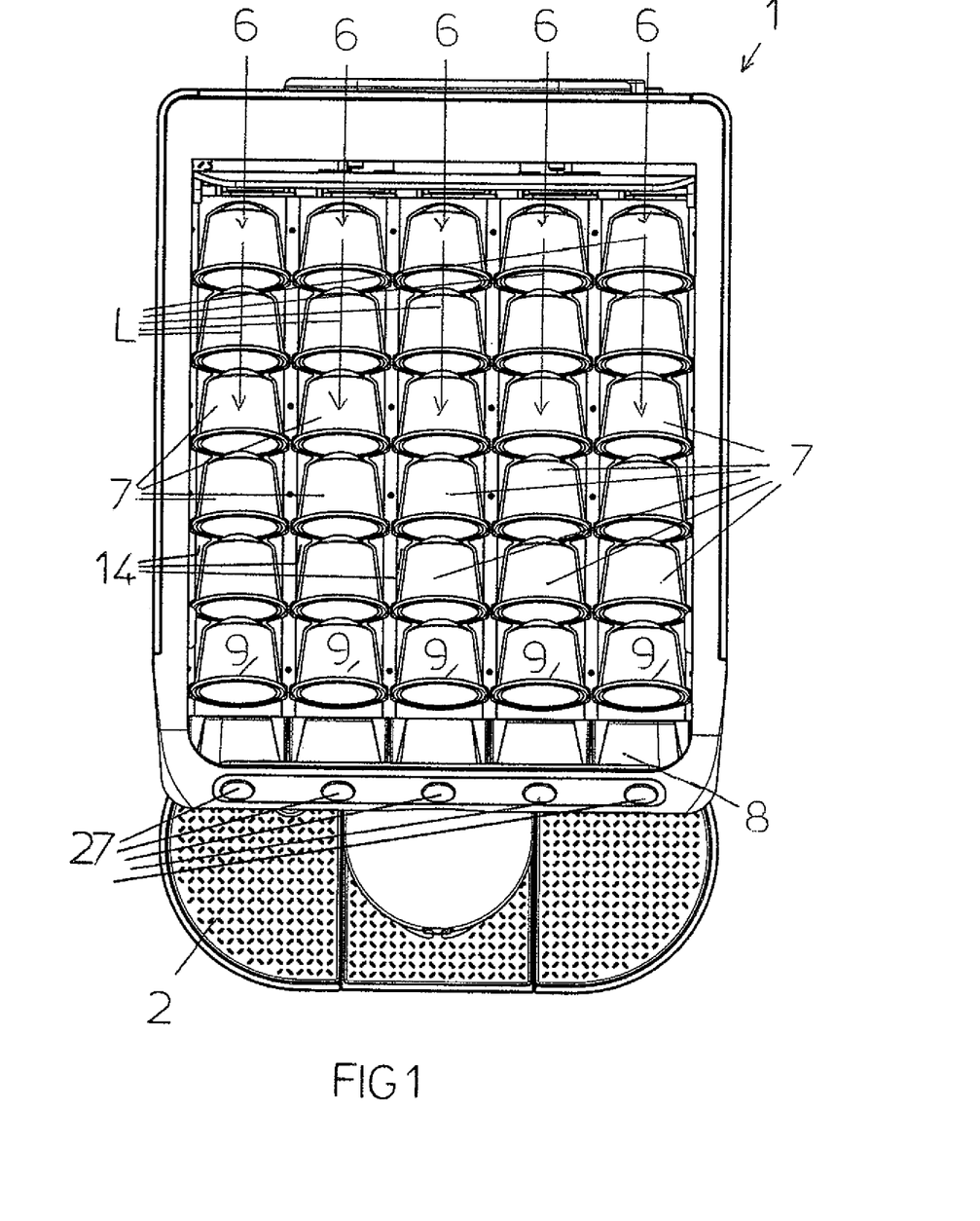
FIG. 1 is a plan view from above of the coffee machine.
Figure 2:
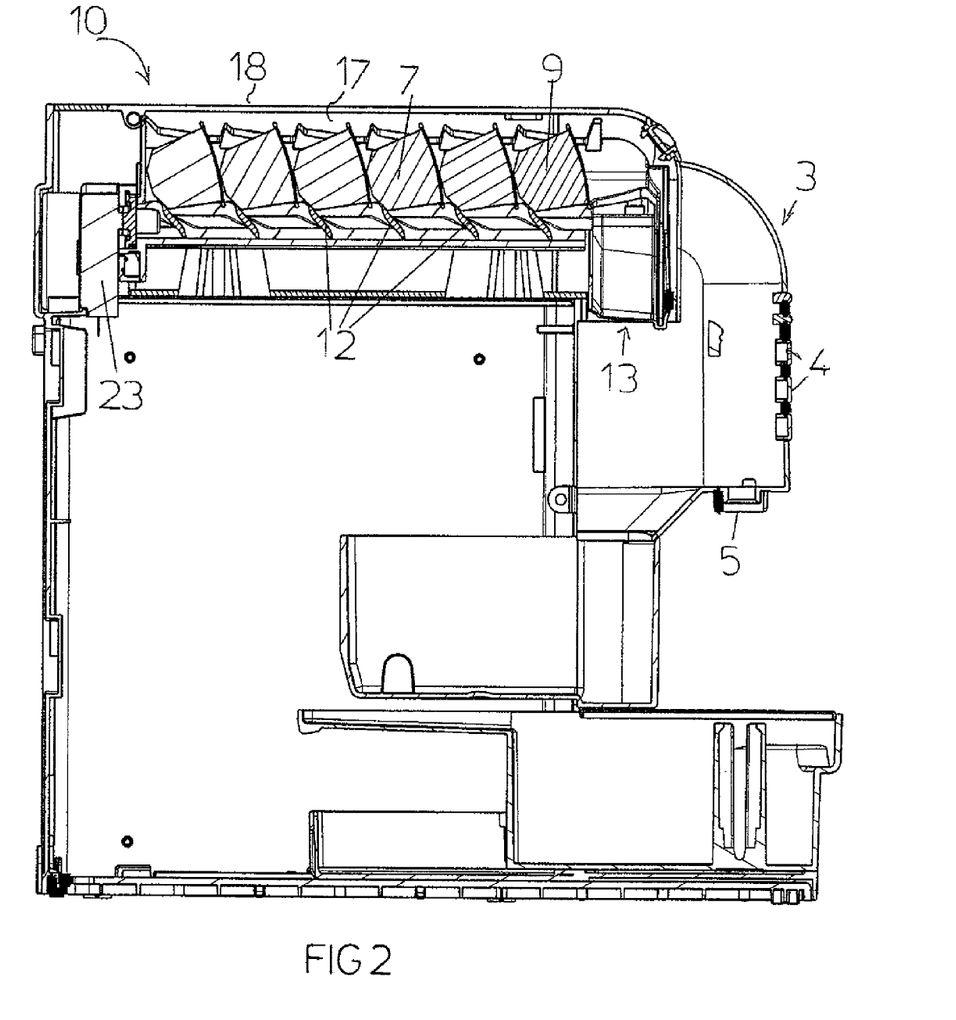
FIG. 2 is a view of the coffee machine of FIG. 1, vertically sectioned.

The coffee machine 1 exhibits, in a known way, a cup rest 2, a control panel 3 with the controls 4, a coffee dispenser 5 suitable for dispensing the beverage to an underlying cup (not shown) positionable on the cup rest 2, an infusor (not shown) having an opening configuration with an infusion chamber for positioning the coffee capsule internally thereof and a closing configuration of the infusions chamber for performing the infusion with the coffee capsule inserted therein, a boiler (not illustrated) and a pump (not illustrated) for supplying the infusor with the heated infusion water from the boiler.

The coffee machine 1 is equipped with a selective loading device of a coffee capsule into the infusor.

Figure 3:
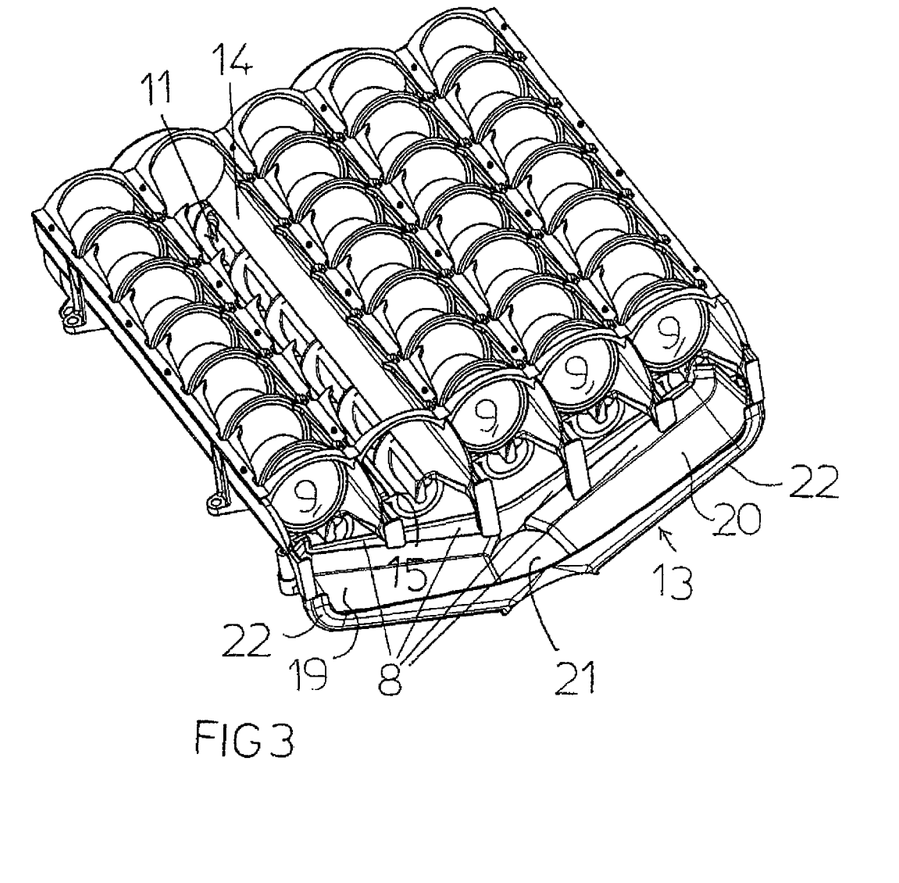
FIG. 3 is an axonometric view of the loading device of the machine of FIG. 1.
Figure 4:
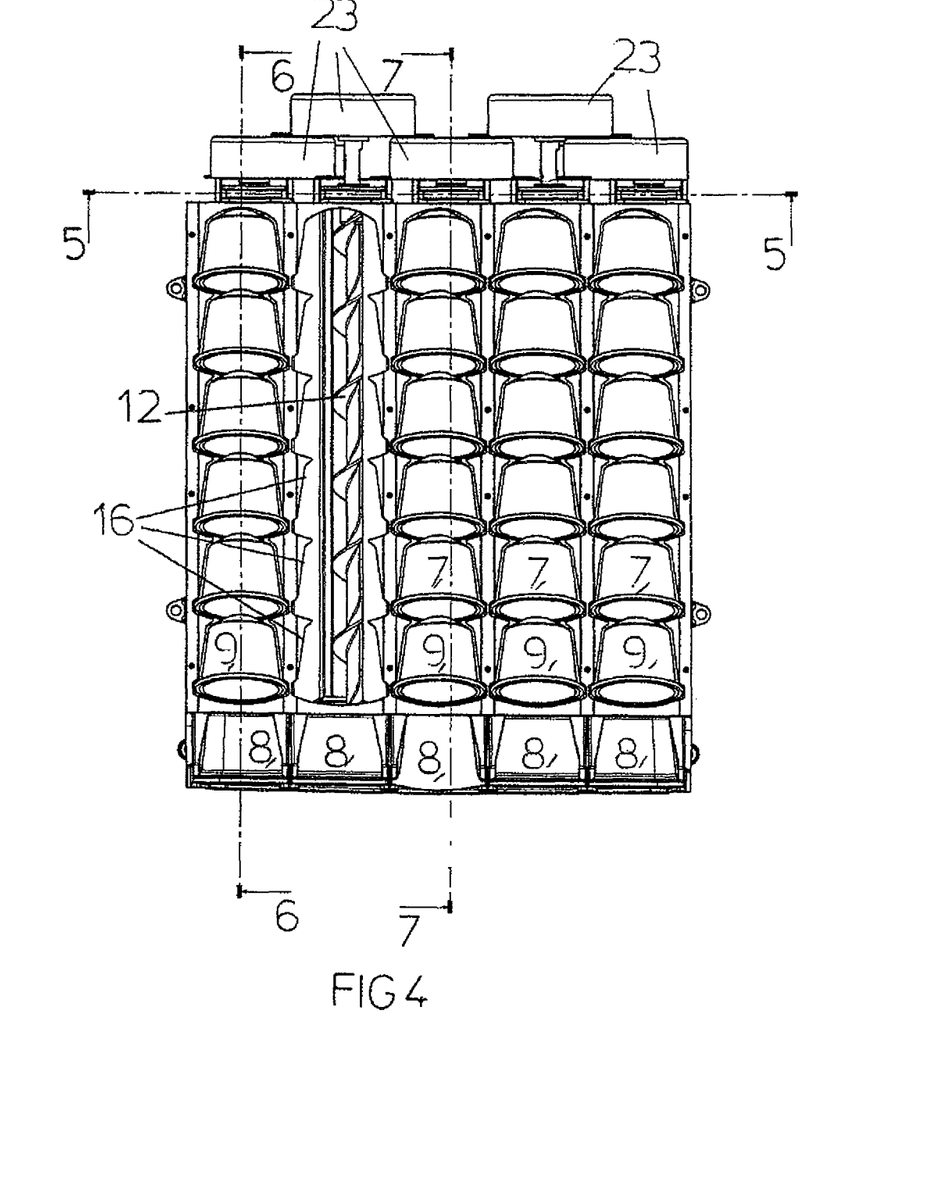
FIG. 4 is a plan view from above of the loading device of FIG. 3.

The loading device comprises at least an advancement line L having motorised means of automatic transport for the movement by a determined step of at least a stack 6 of capsules 7, 9 towards a release section 8.

In particular the loading device exhibits a plurality of advancement lines L, each for advancing a respective stack 6 of capsules 7, 9 towards a respective release section 8.

Respective manual command means are provided for each advancement line L, which manual command means are for enabling advancement of the stack 6 of capsules 7, 9 by a step at a time.

Each advancement line L is configured such that for each advancement by a step of the stack 6 of capsules 7, 9, the head capsule 9 selectively reaches the release section 8.

Each advancement line L develops in a substantially horizontal straight direction from the rear part to the front part of the upper base 10 of the coffee machine 1.

The advancement lines L are thus parallel and are ordered in a common horizontal plan.

Figure 5:
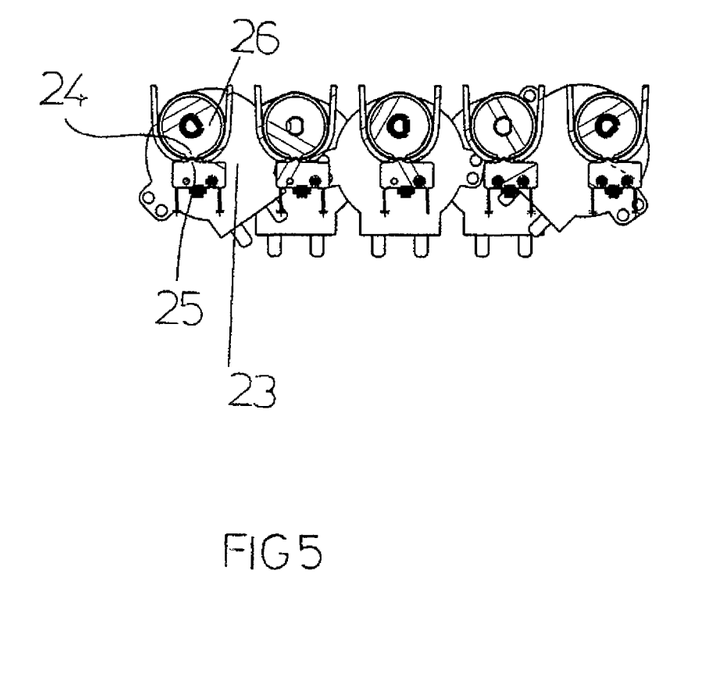
FIG. 5 is a view of the loading device sectioned along line 5-5 of FIG. 4.

In a case where there is more than one advancement line L, as shown, a conveyor 13 is present below the release sections 8, which conveyor 13 is suitable to convey the head capsule 9 released by the release section 8 of any advancement line L by gravitational fall towards the infusor.

The conveyor 13 is configured with two ramps 19, 20 converging towards a lower central section 21 exhibiting a release opening of the capsule by gravitation fall to the underlying infusion chamber in the infusor.

The conveyor 13 further exhibits containing walls 22 suitable for keeping the orientation (horizontal in the present case) of the axis A of the capsules unaltered during the sliding and/or rolling.

In an extreme case of a single advancement line L the conveyor 13 can be absent as the release section 8 can release the head capsule 9 directly to the infusor to which the release section 8 is vertically aligned.

Each advancement line L comprises a support and guide channel 14 in which the stack 6 of capsules 7, 9 is positioned.

The conveying means comprise and conveyor screw 11 for each advancement line L.

The channel 14 and the conveyor screw 11 exhibit the straight longitudinal axis thereof parallel to the straight development direction of the advancement line L.

The channel 14 exhibits, at an upper side thereof, windows 16 having a complementary shape to the capsules 7, 9 for introducing each of the capsules 7, 9 into a corresponding window 16 with a compulsory orientation suitable for correct engagement with the conveyor screw 11.

In particular, each window 16 exhibits a substantially complementary shape to the shape of the section of the capsule 7, 9 containing the axis A of the capsule 7, 9 itself.

The windows 16 all exhibit a same orientation such as to guarantee the positioning with the same orientation of all the capsules 7, 9 in the channel 14, in particular with the axis A parallel and lying in a common vertical plane.

The axis A of the capsules 7, 9 in the channel 14 in particular is slightly inclined with respect to the axis of the channel 14 itself.

All the channels 14 provided are positioned in a housing 17 present at the upper base of the coffee machine 1 and the housing is provided with an openable cover 18 which allows direct access to the channels 14 by the user.

The conveyor screw 11 can be of a spring type (not shown) or of a screw type (shown).

In the case of a conveyor screw of the spring type each capsule is positioned between two adjacent spires of the conveyor screw.

Figure 6:
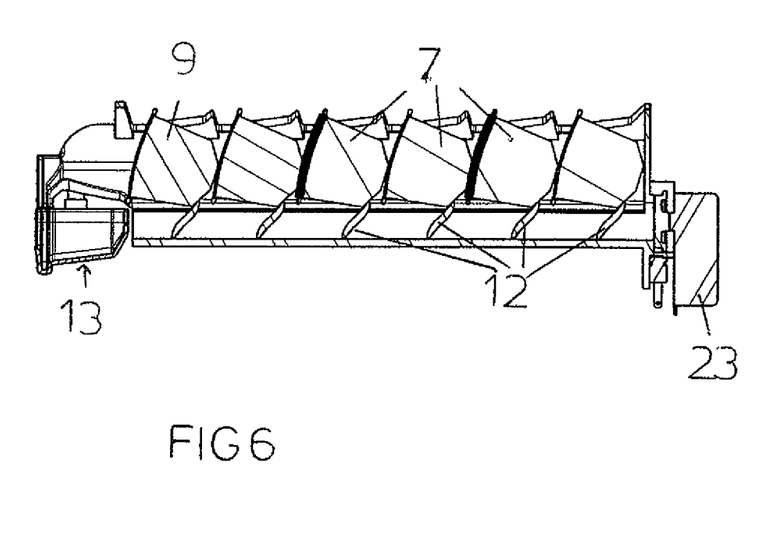
FIG. 6 is a view of the loading device sectioned along line 6-6 of FIG. 4.
Figure 7:
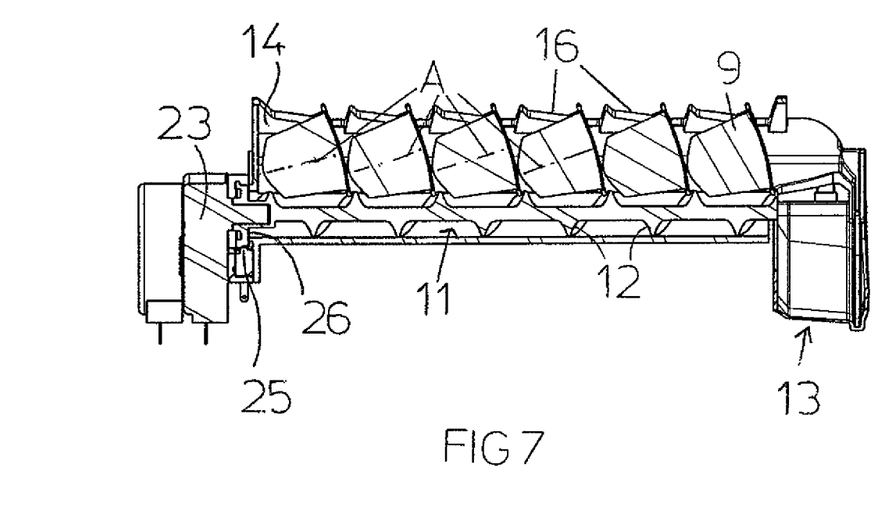
FIG. 7 is a view of the loading device sectioned along line 7-7 of FIG. 4.

In the illustrated case, of a screw type conveyor screw, the thread 12 of the screw type conveyor screw 11 engages the capsules 7, 9 of the stack 6 present in the channel 14. The channel 14 exhibits, in this case, a longitudinal opening 15 for penetration internally thereof of the screw type conveyor screw 11. In particular, the screw type conveyor screw 11 is in a position underlying the channel 14. The pitch of the screw type conveyor screw 11 is such as to enable positioning of each capsule 7, 9 of the stack 6 between two adjacent crests of the thread 12 of the screw type conveyor screw 11. The pitch of the screw type conveyor screw 11 is about the same as the height in the axial direction of the capsules 7, 9.

A motor 23 is present in each advancement line L, at the rear position of the upper base 10 of the coffee machine 1, with a connected reducer, for activating the conveyor screw 11.

The conveyor screw 11 exhibits, at the base 26, a cam 24 for activating a microswitch 25 for halting rotation of the motor 23.

The cam 24 is suitable for activating the microswitch at each 360° rotation of the conveyor screw 11, which corresponds to the advancing of the stack 6 of capsules 7, 9 by a step.

Each manual activating command lastly comprises a button 27 which is suitable for activating the motor 23 of the respective advancement line L in rotation.

The buttons 27 are present at the control panel 3 of the coffee machine 1, each located in a position before the respective advancement line L.

The functioning of the coffee machine 1, with reference to the illustrated solution with the conveyor screw 11 of the screw-type, is briefly as follows.

On first use of the coffee machine, the user loads the capsules 7, 9, first opening the cover 18.

For each advancement line L, the user positions the capsules 7, 9 in the channel 14, introducing them each orientated through a respective window 16.

Thus a stack 6 of capsules 7, 9 is formed, which rest with the rear base thereof against the thread 12 of the conveyor screw 11 which penetrates radially internally of the channel 14 via the opening 15.

In a hypothetical case in which each advancement line L is loaded with capsules 7, 9 containing a specific coffee flavouring, the user can thus select a particular flavour by pressing a control button 27.

The button 27 activates the motor 23 which halts when the cam 24 activates the microswitch 25, i.e. when the conveyor screw 11 performs a 360° rotation about the axis thereof.

During the rotation, the conveyor screw 11 pushes with the thread 12 against the base of the capsules 7, 9, causing the stack 6 to advance by a step.

By effect of the advancing by a step, the head capsule 9 reaches the release section 8 which it leaves by gravitation fall, falling such as to be received in the underlying conveyor 13 along which it slides and rolls, still by gravitational effect, up to reaching the opening of the section 21 such as finally to fall into the open infusion chamber with the axis A thereof already orientated in the direction of reciprocal translation of the mobile parts which form the infusion chamber.

The command electronics of the coffee machine 1, following the pressing of the button, are able to manage the performing of the infusion cycle, by commanding the closure of the infusion chamber after the capsule has reached the infusion chamber.

By effect of the advancement of the stack 6 by a step, the capsule 7 adjacent to the just-released head capsule 9 is brought into the head position of the stack 6 and is ready to be released upon the next activation of the button 27.

The loading device as it is conceived is susceptible to numerous modifications and variants, all falling within the ambit of the inventive concept.

In practice the materials used, as well as the dimensions thereof, can be any, according to needs and the state of the art.

The invention claimed is:

1. A coffee machine exhibiting a selective loading device of a coffee capsule into an infusor, the selective loading device comprising:
   at least one advancement line, each advancement line exhibiting a motorized conveyor screw that is configured to move, at a determined step, a stack of capsules along a support and guide channel of the advancement line towards a release section, and
   a manual command control for each advancement line, the manual command control enabling advancement by a determined step of the stack of capsules along the support and guide channel, where the support and guide channel exhibits, at an upper side thereof, windows having a complementary shape to the capsules for introduction of each of the capsules into a corresponding window with a compulsory orientation suitable for correct engagement with the motorized conveyor screw, and where the support and guide channel exhibits a longitudinal opening internally of which the motorized conveyor screw can penetrate.

2. The coffee machine of claim 1, wherein the support and guide channel and the conveyor screw exhibit longitudinal axes that are straight and parallel to a straight development direction of the advancement line.

3. The coffee machine of claim 1, wherein the advancement line exhibits a straight development.

4. The coffee machine of claim 1, wherein the advancement line develops from a rear part to a front part of an upper base of the coffee machine.

5. The coffee machine of claim 1, wherein the advancement line develops substantially horizontally.

6. The coffee machine of claim 1, wherein the support and guide channel is positioned in a housing present at an upper base of the coffee machine and the housing is provided with an openable cover for access to the support and guide channel.

7. The coffee machine of claim 1, where the selective loading device exhibits a plurality of advancement lines, and in that a descending fixed conveyer is positioned below respective release sections associated with the plurality of advancement lines, wherein the conveyor is common to all of the advancement lines, and wherein the conveyor is configured to allow a respective capsule, released by a respective release section, to slide and roll by gravity towards a section that is vertically aligned relative to an underlying infusor.

8. The coffee machine of claim 1, wherein the motorized conveyor screw exhibits, at a base thereof, a cam that activates a microswitch for interrupting rotation of a motor that activates the motorized conveyor screw to facilitate step advancement of the stack of capsules.

9. The coffee machine of claim 8, wherein the motor is positioned at a rear portion of an upper base of the coffee machine.

10. The coffee machine of claim 1, wherein the motorized conveyor screw is a spring-type conveyor screw.

11. The coffee machine of claim 1, wherein the motorized conveyor screw is a screw-type conveyor screw.

12. The coffee machine of claim 1, wherein the motorized conveyor screw is in a position underlying the support and guide channel.

* * * * *